Sept. 10, 1940.           A. A. THOMAS            2,214,490
                        BONE-SETTING SPLINT
                       Filed Feb. 8, 1937        3 Sheets-Sheet 1
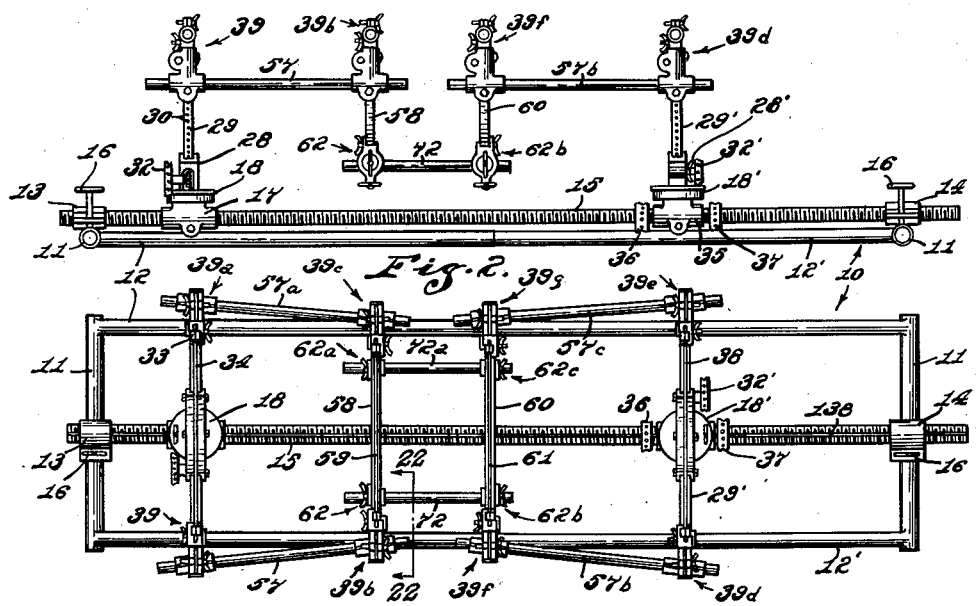
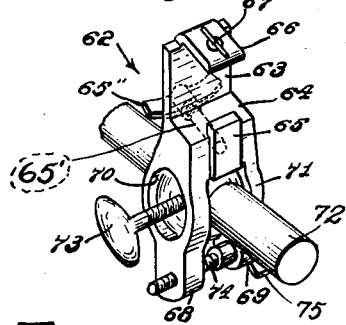
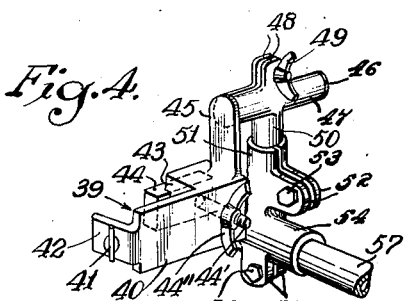
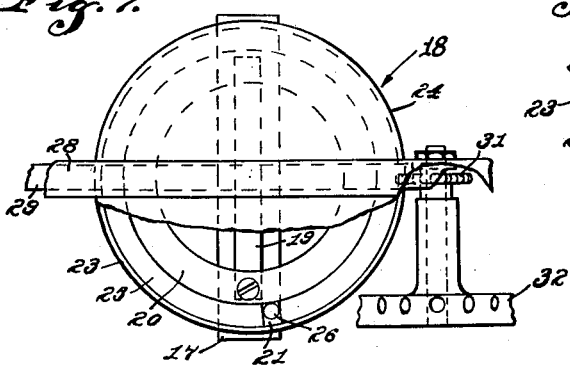
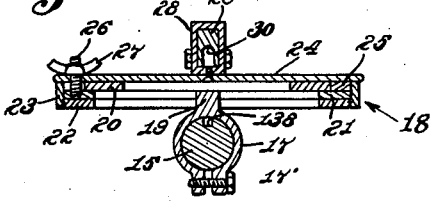
INVENTOR.
Albert A. Thomas,
BY
Hood + Hahn.
ATTORNEYS.

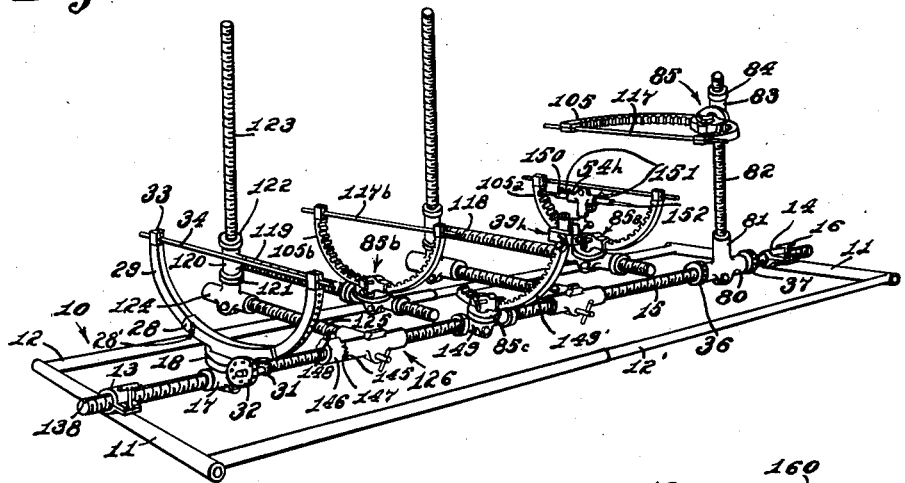
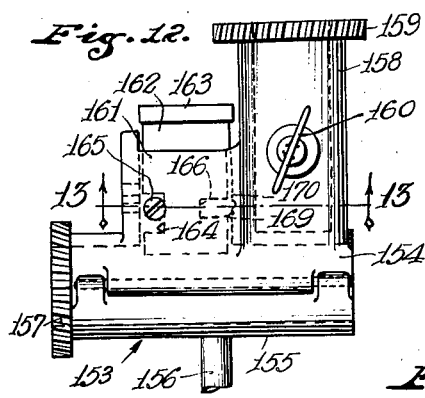
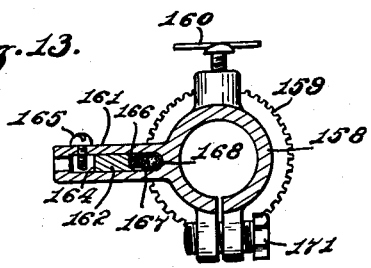
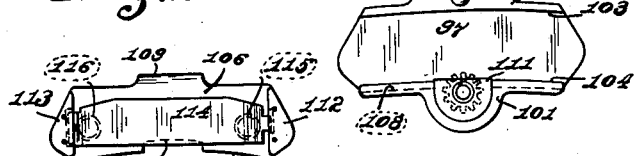
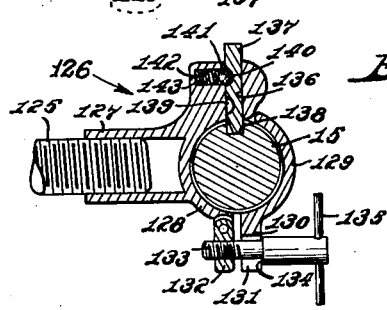
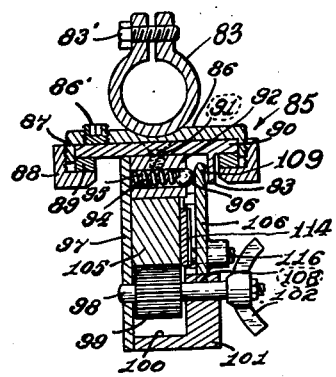

Sept. 10, 1940.  A. A. THOMAS  2,214,490
BONE-SETTING SPLINT
Filed Feb. 8, 1937  3 Sheets-Sheet 3
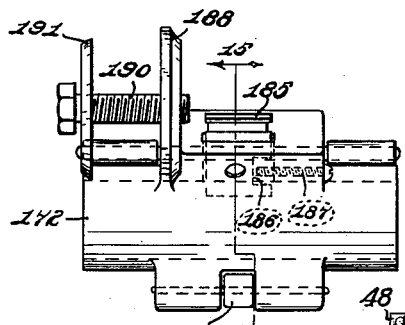
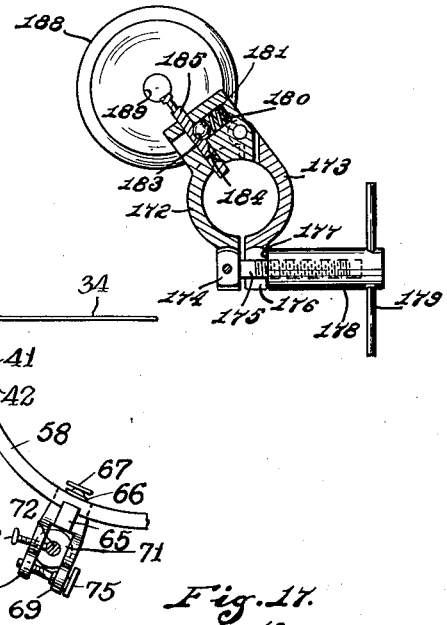
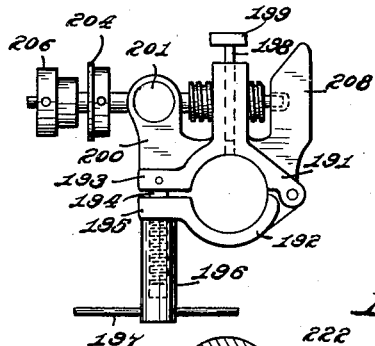
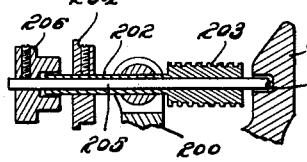
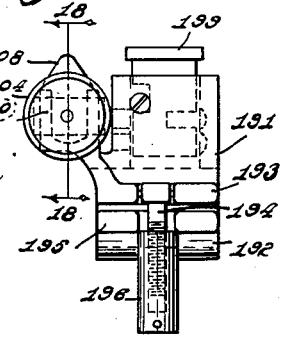
INVENTOR.
Albert A. Thomas,
BY
Hood + Hahn.
ATTORNEYS.

Patented Sept. 10, 1940

2,214,490

UNITED STATES PATENT OFFICE 2,214,490

BONE-SETTING SPLINT

Albert A. Thomas, Indianapolis, Ind.

Application February 8, 1937, Serial No. 124,560

18 Claims. (Cl. 128—84)

The present application relates to bone-setting splints, and more particularly is directed to improvements in splints of the general character disclosed in my prior Patent No. 2,056,749, issued October 6, 1936. A primary object of the invention is to provide means whereby the structure of splints of this general character may be simplified and rendered more satisfactory for use in connection with a convalescing patient. Further objects of the invention include improvements of details of construction of such a splint; and will appear in detail as the description proceeds.

To the accomplishment of the above and related objects, my invention may be embodied in the form illustrated in the accompanying drawings, attention being called to the fact, however, that the drawings are illustrative only, and that any change may be made in the specific construction illustrated and described, and that the elements embodied in my invention may be used in any number, position, or combination that is necessary to meet the indications for treatment in any specific individual fracture, so long as the scope of the appended claims is not violated.

Fig. 1 is a side elevation of one form of my present invention;

Fig. 2 is a plan view thereof;

Fig. 3 is a perspective view of a bracket used in connection with the splint of the present application;

Fig. 4 is a perspective view of a different type of bracket likewise used in connection with the splint of the present application, the elements thereof being shown out of normal adjusted position for clarity of illustration;

Fig. 5 is a perspective view of certain elements of the invention arranged in a different manner;

Fig. 6 is a sectional view through a support used in connection with the apparatus of the present application;

Fig. 7 is a fragmentary plan of the support illustrated in Fig. 6, portions being broken away for clarity of illustration;

Fig. 8 is a section through a different type of support, likewise used in the apparatus of the present application;

Fig. 9 is an elevation of an element of the organization of Fig. 8;

Fig. 10 is an elevation of another element of the organization illustrated in Fig. 8;

Fig. 11 is a longitudinal section through a still further type of support or attaching means;

Fig. 12 is a plan view of another form of attaching means;

Fig. 13 is a section therethrough taken substantially upon the line 13—13 of Fig. 12 and looking in the direction indicated by the arrows;

Fig. 14 is a side view of still another form of attaching means;

Fig. 15 is a transverse section taken substantially upon the line 15—15 of Fig. 14 and looking in the direction indicated by the arrows;

Fig. 16 is an end elevation of an adjusting mechanism;

Fig. 17 is a side elevation thereof, looking from the left of Fig. 16;

Fig. 18 is a section taken substantially on the line 18—18 of Fig. 17 and looking in the direction indicated by the arrows;

Fig. 19 is a fragmental section, showing a portion of a bone and a support for a threaded drill engaging the same;

Fig. 20 is a section through the drill and support of Fig. 19 taken at right angles thereto;

Fig. 21 is an enlarged view of a detail of the organization of Figs. 19 and 20; and Fig. 22 is a somewhat enlarged view taken substantially on the line 22—22 of Fig. 2 and looking in the direction of the arrows.

Referring more particularly to the drawings, and specifically to Figs. 1 and 2, it will be seen that I have illustrated a splint comprising a base indicated generally by the reference numeral 10, and consisting of end members 11 and telescopic side elements comprising tubes 12 and rods or tubes 12' received therein and providing a mounting for two elements 13 and 14 in which is mounted a threaded rod 15 which may be clamped in any desired position in the base. Screws 16 are provided for tightly closing the clamping elements 13 and 14.

A split clamping sleeve 17 is mounted upon the rod 15 adjacent one end thereof, and provides a mounting for a support 18 which is illustrated specifically in Figs. 6 and 7. As is clearly to be seen in those figures, the split sleeve 17 is provided with a clamping screw 17' and carries a rail 19 to which is suitably secured a ring member 20. A ring 21 is received between the member 20 and a third ring 22 which is threadedly received within a flange 23 of a housing element 24. Surrounding the ring 20 and spacing the same from the flange 23 is an interrupted ring 25, a stud 26 carried by the ring 21 projecting through the interruption between the ends of the ring 25, and through an aperture in the housing element 24 to receive a wing nut 27. This construction permits, when the nut 27 is loose, free and unlimited rotation of the housing element 24 about its vertical center; but said housing may be held against such rotation by tightening the wing nut 27 to clamp the ring 20 between the ring 21 and housing element 24.

Suitably mounted upon the housing 24 is a guideway 28 in which is received a part-annular saddle 29 which is formed, in its outer periphery, with a plurality of equally spaced sockets 30 with which cooperate the teeth of a pinion 31, suitably carried by the guide 28, said pinion being actuable by a hand wheel 32. Preferably, means, such as a clamping bolt 28', is provided for locking the saddle against movement through the guide 28; but when that means is released, the saddle may be rotated about its center of curvature by operation of the hand wheel 32. At the extremity of each of the arms, the saddle 29 is provided with means, indicated at 33 in Figs. 2 and 5, for firmly gripping one end of a wire or drill 34 (Fig. 2) which is adapted to be projected through a fractured bone. The device is so proportioned and arranged that the wire 34, when in position, intersects the center of curvature of the saddle 29.

A second split sleeve clamping means 35 is suitably slidably mounted upon the rod 15, and is flanked by two nuts 36 and 37 whereby said sleeve 35 may be shifted axially of the rod 15. Said sleeve 35 carries a unit 18' identical in all respects with the unit 18, and which supports a saddle 29' identical in all respects with the saddle 29 adapted to be adjusted by means of a hand wheel 32'. Said saddle 29' carries a wire 38 (Fig. 2) similar to the wire 34.

A bracket 39 is mounted upon one arm of the saddle 29. This bracket is illustrated in detail in Fig. 4, from a consideration of which it will be seen that the bracket comprises a clamp 40 including walls 42 and 43 with which cooperates a tongue 44, which is adjustable through the medium of a bolt 44' and wing nut 44". The socket formed by the walls 42 and 43 and the tongue 44 may be fitted over an arm of the saddle 29, and clamped in place by operation of the nut 44" and a set screw 41 carried by the wall 42.

An arm 45 projects from the end wall 43 and carries a trunnion 46 which, when the bracket is in position on the saddle, is coaxial with the wire or needle 34. A split sleeve clamping member 47 is mounted upon the trunnion 46 and is provided with a pair of ears 48 with which cooperates a clamping screw 49 which is operable to clamp the sleeve 47 in any desired adjusted position on the trunnion 46. The sleeve 47 carries a trunnion 50 which is perpendicular to the axis of the sleeve 47, and upon which is mounted a split sleeve 51 provided with spaced ears 52 with which cooperates a clamping bolt 53. The sleeve 51 carries a further split sleeve 54, perpendicular to the axis of the sleeve 51, and provided with spaced ears 55 with which is associated a clamping bolt 56. A rod 57 is received in the sleeve 54.

It will be seen that this arrangement provides a mounting for the rod 57 which will permit oscillation of said rod about its own axis and about two external, relatively perpendicular axes. The mounting is so constructed, however, that oscillation about any one of the above-mentioned axes may be prevented, the means for preventing oscillation about the respective axes being respectively independent.

As will be seen from an inspection of Fig. 2, the bracket 39 is mounted adjacent one extremity of the saddle 29, and a similar bracket 39a is mounted adjacent the opposite extremity of said saddle. The rod 57, carried by the bracket 39, carries at its opposite end a similar bracket 39b which is secured adjacent one extremity of a saddle 58. The rod 57a carried by the bracket 39a carries likewise a bracket 39c which is secured to the opposite extremity of the saddle 58. By this means, the saddle 58 is connected to, and supported from, the saddle 29; and it will be seen that, if the clamping bolts 56 and 53 of the brackets 39 and 39a are tightened; and if all of the clamping bolts of the brackets 39b and 39c are tightened, the saddle 58, with its associated wire 59, may be moved with respect to the saddle 29 only about the axis of the trunnions 46 of the brackets 39 and 39a, which is coincident with the axis of the wire 34. Thus, the saddles 29 and 58, with their associated wires 34 and 59, have been converted into a single unit, the parts of which may be relatively adjusted in one manner only.

Brackets 39d and 39e are associated with the saddle 29', and their rods 57b and 57c support brackets 39f and 39g which are secured to the arms of a saddle 60 with which is associated a wire 61. In a like manner, the saddles 29' and 60 are thus arranged for unitary manipulation. When the two units, comprising the four saddles, have been suitably adjusted, they may be locked in such adjusted position through the medium of the mechanism now to be described. It is to be noted that the trunnion 46 of each of the brackets (39, 39a, 39b, 39c, 39d, 39e, 39f and 39g) is coaxially aligned with the wire (34, 38, 59 or 61) with which it is directly associated.

In Fig. 3 there is illustrated a bracket indicated generally by the reference numeral 62. Said bracket is formed, like the clamp 40, to provide a wall 63 bounded by parallel walls 64 and 66. A tongue 65 is associated with the wall 64 and is shiftable through the medium of a bolt 65' and a wing nut 65", and a set screw 67 is carried by the wall 66. The wall 66 may be hooked over a portion of the saddle 58 so that, when the set screw 67 is turned down and the wing nut 65" is suitably operated, the saddle portion will be tightly gripped whereby the bracket 62 is rigidly associated with said saddle.

Depending below the wall 64 are a pair of spaced legs 68 and 69 formed with aligned apertures. In Fig. 3, the aperture 70 in the leg 68 is clearly shown, but the perspective of the figure is such as to prevent a view of the aperture in the leg 69. A ball 71 is received between the legs 68 and 69 and projects part way through the apertures in the legs 68 and 69. Said ball is formed with a polar bore in which is received a rod 72 adapted to be secured in adjusted position by a set screw 73 received in a threaded bore intersecting the bore in which is received the rod 72. A clamping bolt 74 is associated with the extremities of the legs 68 and 69 and is provided with a hand bar 75 whereby said bolt may be rotated to clamp the legs 68 and 69 against the ball 71 to prevent movement thereof.

A similar unit 62a is connected to the saddle 58 at a spaced point; and the rods 72 and 72a are connected also to the balls 71 of brackets 62b and 62c carried by the saddle 60.

It will be obvious that, when the clamping bolts 49, 53, and 56 of the brackets 39, 39a, 39b, 39c, 39d, 39e, 39f, and 39g, and the clamping bolts 74 and set screws 73 of the brackets 62, 62a, 62b, and 62c are all tightly set, the four saddles 29, 29', 58 and 60 are rigidly held against movement with respect to each other.

Preferably, the rod 15 is formed with a longitudinally extending slot or kerf 138 (see Figs. 2 and 6) and the sleeves 17 and 35 are provided with keys received in said slot to hold said sleeves positively against rotation about the axis of the rod 15.

In Fig. 5 there is illustrated a somewhat more complicated embodiment of the present invention which is useful where extremely close adjustments are necessary.

In said embodiment of the invention, I have shown a sleeve 80 in place of the sleeve 35, said sleeve 80 being formed with a perpendicular standard 81 receiving a threaded rod 82 upon which is slidably mounted a split clamping sleeve 83 flanked by nuts 84, only the upper one of which is shown. Said sleeve 83 carries a supporting unit 85 which is illustrated in detail in Figs. 8, 9 and 10.

Said unit comprises a disc 86 having a peripheral, externally threaded flange 87 with which is threadedly associated a flanged sleeve 88 supporting a ring 89. Between the ring 89 and the disc 86 is received a disc 90 to which is suitably secured, as by screws 91, an element 92. The disc 90 is provided with a depending tongue 93 for a purpose later to be explained.

The element 92 is formed with a bore 94 in which is received a coiled spring 95 and a ball 96, the end of the bore 94 being peened over to hold the ball 96 within the bore.

A back plate 97 is suitably secured to one surface of the element 92 and provides a bearing for one end of a shaft 98 upon which is mounted a pinion 99 received in a socket 100 of an element 101 secured to the back plate 97. As is clearly shown in Fig. 9, the elements 92 and 101 are formed to provide curved walls 103 and 104 cooperating with the wall 97 to form a guide for a saddle 105. Said saddle is formed on its inner surface with rack teeth adapted to cooperate with the pinion 99; and it will be clear that the elements 92, 97, and 101 form an open-sided guide into which the saddle may be inserted through the open side.

A front plate 106 is formed with one curved edge 107 adapted to be received in a groove 108 formed in the surface 104 of the element 101. As is clearly shown in Fig. 8, the lateral extent of the element 92 is substantially equal to the thickness of the saddle 105; while the lateral extent of the element 101 is somewhat greater. The inner wall of the groove 108 lies substantially in the plane of the forwardly presented face of the element 92.

The edge of the closure plate 106 opposite the edge 107 is formed with a projecting tongue 109 which is adapted to be inserted in the space between the forward face of the element 92 and the depending tongue 93 on the disc 90, thereby engaging the ball 96 to be pressed, by the spring 95, against the tongue 93. After insertion of the tongue 109 into the space between the element 92 and the tongue 93, the edge 107 of the plate 106 may be shifted into registry with the groove 108, whereafter the plate 106 may be moved downwardly to enter the edge 107 into the groove 108. The tongue 109 is of such length that, even after the edge 107 of said plate has been seated in the groove 108, the tongue 109 is still engaged by the ball 96. The edge 107 of the plate 106 is notched as at 110 for cooperation with a portion 111 of the element 101 which interrupts the groove 108.

On its inner face, the plate 106 is provided with retainers 112 and 113 which hold in place a leaf spring 114 adapted to engage and press against the outer face of the saddle 105; and set screws 115 and 116 are provided to force said spring 114 into clamping engagement with said saddle.

It will be clear that rotation of the shaft 98 through the medium of the wing 102 will cause adjustment of the saddle 105 about its center of curvature; that the saddle guide may be rotated about the center of the disc 86; and that the sleeve 83 may be vertically adjusted on rod 82 by manipulation of the nuts 84, and may be manually rotated about the axis of the rod 82 unless locked in place by tightening the clamping bolt 83'. A set screw 86' is preferably provided to lock the disc 90 against rotation, when desired. The saddle 105 is provided with means for gripping the ends of a wire 117 which is located in such a position as substantially to intersect the center of curvature of the saddle 105.

Similar units 85a and 85b are mounted upon threaded rods 118 and 119 which are horizontally supported in a manner now to be described. Since the units in which are included rods 118 and 119 are identical in all respects, only one will be described.

The rod 119 is carried by a sleeve 120 which is flanked by nuts 121 and 122 and adjustably mounted on a threaded rod 123. The rod 123 is carried by a split clamping sleeve 124 mounted upon a rod 125 carried by a clamp unit 126. The unit 126 is illustrated in detail in Fig. 11.

The rod 125 is received in a sleeve 127 carried by a part-cylindrical element 128 to which is hinged a part-cylindrical element 129 having a depending ear 130 which is notched as at 131. The element 128 likewise carries a hinged ear 132 in which is threadedly received a bolt 133 formed with a shoulder 134. Obviously, if the bolt 133 is loosened, by counterclockwise rotation of the hand bar 135, the bolt may be dropped out of the notch 131 by hinging movement of the ear 132. Thereafter, the element 129 may be swung away from the element 128 and the unit 126 may be lifted off the rod 15. In a suitable slot 136 formed in the element 128 is slidably received a key 137 adapted to enter the slot 138 in the rod 15. Said key 137 is formed in one face with two sockets 139 and 140 adapted alternatively to receive a ball 141 urged outwardly from a bore 142 formed in the element 128 by a spring 143 received therein. In the position illustrated in Fig. 11, the key 137 will hold the unit 126 against rotation about the axis of the rod 15; but such key may be withdrawn to permit such rotation. Upon such withdrawal, the ball 141 will hold the key in withdrawn position until it is again manually depressed.

The organization of Fig. 5 will be used in cases in which extremely fine and delicate manipulation of the bone fragments is necessary. If desired, after the bone fragments have been suitably positioned by such delicate manipulation, brackets 39 and rods 57 may be associated with the saddles 29, 105, 105a and 105b in the manner illustrated in Figs. 1 and 2, and thereafter the saddles 105a and 105b may be removed from their holding units 85a and 85b and the clamping units 126, together with all of the elements carried thereby, may be entirely removed from the organization.

If desired, one end of the sleeve 126 may be provided with crown teeth 145, and an element 146 may be associated therewith. The element 146 is mounted upon the rod 15 and is provided with crown teeth 147 for cooperation with the teeth 145 of the sleeve 126. A key 148, carried by the element 146, is projectible into the kerf 138 to hold the element 146 against rotation about the axis of the rod 15. Obviously, if the key 137 is retracted, and if the key 148 is projected into the kerf 138, the sleeve 126 may be adjusted about the axis of the rod 15, to any one of a plurality of positions, depending solely upon the number of teeth 145 and 147 provided on the elements 126 and 146.

If desired, I may mount upon the rod 15 a split sleeve supporting element 149 directly carrying a unit 85c similar to the unit 85. In the guideway of said unit 85c, there may be mounted a saddle 149' with which may be associated a unit 39h. Preferably, the end of the saddle 149' is cylindrical, so that the clamp member of the unit 39h may be adjusted about the axis of the end of said saddle. In the tube or sleeve 54h of the unit 39h there is clamped a tube 150 provided with a set screw 151, said tube receiving a drill 152 which is adapted to be driven into a bone or bone fragment, without projecting entirely through said bone. It will be seen that the illustrated arrangement provides for a wide variety of adjustments of the drill 152.

In Figs. 12 and 13, I have illustrated an attaching unit 153 which may be substituted, if desired, for the unit 80—81, for the unit 120, for the unit 124, or for the unit 126. The unit 153 comprises a part cylindrical element 154 to which is hinged a second part cylindrical 155, said elements being adapted to be clamped about the associated rod 15 through the medium of a bolt 156 similar to the bolt 133 or the bolt 171 or the bolt 175, and similarly associated with the elements 154 and 155. At one end, the tube formed by the elements 154 and 155 is formed with a worm wheel 157.

Laterally projecting from the element 154 and perpendicular to the axis of the tube formed by the elements 154 and 155, is a socketed tube 158, the free end of which is likewise formed to provide a worm wheel 159. A set screw 160 is provided for engaging an element received in the socket of the tube 158; said element so received being preferably provided with an annular groove for the reception of the set screw end, whereby said element may be rotated about its own axis without axial movement.

A guideway 161, likewise preferably integral with the element 154, receives a key 162 adapted to be projected into the interior of the sleeve or tube formed by the elements 154 and 155 to enter the kerf 138 in the rod 15. Said key is formed with a gripping head 163 outside the guideway 161; and within the guideway 161, said key is notched as at 164. A screw 165 projecting into the guideway 161 enters the notch 164 to limit the throw of the key 162.

The key 162 is likewise notched in its opposite edge as at 166 to receive a spring 167 and a ball 168, said spring urging the ball outwardly of the notch 166. The adjacent wall of the guideway 161 is formed with two or more sockets 169 and 170 adapted to receive a portion of the ball 168 to hold the key 162 resiliently in either of two adjusted positions. A suitable clamping bolt 171 is provided for pulling together the edges of the split sleeve 158 to clamp a received element in place in the sockets thereof.

Since the key 162 is parallel with the axis of the sleeve 158, it is obvious that, when said key is entered in the kerf 138, the axis of the tube 158 is vertical.

In Figs. 14 and 15, I have illustrated still another means, mountable on the rod 15, or on any other one of the supporting rods, for supporting units which are desired to be used in adjusting or holding the bone fragments. Said unit comprises a part cylindrical element 172 to which is hinged a part cylindrical element 173. The element 172 is formed with a notched ear in which is oscillably mounted the head 174 of a bolt 175. The unit 173 is provided with an ear slotted as at 176 for the reception of the bolt shank 175, the end 177 of a socket nut 178 being receivable against the outer surface of the slotted ear of the element 173. Obviously, when the hand-bar 179 is rotated in a clockwise direction, the elements 172 and 173 will be forced toward each other.

The element 172 is formed with a socket 180 in which are received a spring 181 and a ball 182, the spring urging the ball toward a seat in one or the other of two sockets 183 and 184 formed in a key 185 slidably mounted in a slot formed in the element 172. The key 185 is formed with a notch 186 with which cooperates a screw 187 to limit the movement of said key.

The element 172 likewise carries a disc 188 formed with a threaded bore 189 for the reception of a bolt 190 which carries a second disc 191. A suitably formed arm or bar may be mounted upon the unit of Figs. 14 and 15 by removing the bolt 190, passing it through a bore formed in said arm or rod, and then threading the bolt 190 again into the bore 189 and turning it up to clamp said rod or bar between the discs 191 and 188. Obviously, with this arrangement, the mounted arm or bar may be moved to any one of a plurality of adjusted positions about the axis of the bolt 190, and may be clamped in any one of such positions.

In Figs. 16, 17 and 18, I have illustrated mechanism associable with the unit 153, for mechanically moving said unit into any desired position of adjustment about the axis of the rod on which said unit 153 is mounted, and for holding said unit in any such position. The unit of Figs. 16, 17 and 18 comprises a part cylindrical element 191 to which is hinged a part cylindrical element 192. The element 191 is formed with a projection 193 in which is carried, in a manner similar to that illustrated in Fig. 15, the head of a bolt 194. The element 192 is formed with a slotted ear 195 for the reception of the stem of the bolt 194; said bolt carrying associated nut 196 provided with a hand bar 197.

A key 198, having a thumb piece 199, is adjustably mounted in a slot formed in the element 191, and is adapted to be projected into the kerf 138.

The element 191 carries a standard 200 which, at its free end, is bifurcated to provide opposed journals for a trunnion 201 in which is rotatably mounted a tubular shaft 202 carrying a worm 203. Fixed on the shaft 202 is a hand-wheel 204; and an axle 205 provides a journal mounting for the shaft 202, said axle having one end received in a socket 207 formed in a standard 208 carried by the element 191. A thumb piece 206 is fixed on the axle 205.

It will be obvious that the unit of Figs. 16, 17, and 18 may be mounted upon the rod 15 and clamped in position thereon by the action of the nut 196, the key 198 being projected into the kerf 138. The unit may be so positioned as to engage the worm 203 with the teeth of the worm-wheel 157. Now, if the key 162 is retracted, rotation of the hand-wheel 204 will result in adjustment of the unit 153 about the axis of the rod 15. If it is desired to make a gross adjustment of the unit 153, the axle 205 may be withdrawn from its engagement in the socket 207, whereupon the worm 203 may be shifted upwardly (rotating about the axis of the trunnion 201) out of engagement with the teeth of the worm-wheel 157, whereupon the unit 153 may be adjusted manually to any desired degree; after which the worm 203 may be again engaged with the worm-wheel 157, the axle 205 again entered in the socket 207, and the ultimate adjustments may be made by rotation of a hand-wheel 204.

Alternatively, the unit of Figs. 12 and 13 may be substituted for the unit 80—81 and secured against rotation with respect to the rod 15 by engagement of the key 162 in the kerf 138. The rod 82 will then be received in the tube or sleeve 158; and said rod will preferably be provided with a peripheral groove to receive the inner end of the set screw 160. Thereby, said rod 82 will be held against movement axially of the sleeve, but will be free to rotate therein.

If, now, the unit of Figs. 16–18 is tightly clamped to the rod 82 with the worm 203 meshing with the worm wheel 159, it will be obvious that manipulation of the hand wheel 204 will result in rotation of the rod 82 about its own axis.

Similarly, the unit of Figs. 12 and 13 might be substituted for the unit 124, in which case, the unit of Figs. 16–18 could be used to rotate the rod 123 about the axis of the rod 125. Or the unit 153 might be substituted for the unit 120 in which case the unit of Figs. 16–18 could be used to rotate the rod 119 about the axis of the rod 123. The latter effect might also be attained by substituting the unit of Figs. 12 and 13 for the unit 124 and interposing the unit of Figs. 16–18 between the sleeve 158 and the unit 120.

While the manner of use of the organizations of the present application will be obvious to any skilled surgeon, it is believed that some discussion thereof will be advantageous.

While the segments of the fractured limb above and below the fracture are maintained in as nearly as possible normal relationship to each other and the trunk, the bone segments are engaged by drills, as far distal and as far proximal, and as near above and as near below the site of fracture, as practicable. These drills may be driven entirely through the bone and the soft parts until their ends project on either side of the limb; or they may be driven only through the soft parts on one side of the limb and into the bone until firmly engaged therein, without passing entirely through the limb. If the latter type of drill is used, the drill will be provided with self-tapping threads which will cooperate with threads cut by the drill in the bone to fix the drill firmly in the bone. If the former type of drill is used, the drill will be smooth except at its point, so that, in the absence of provision thereagainst, it will be possible for the bone not only to rotate about the drill but also to shift longitudinally with respect to the drill. The bone may be held against such longitudinal shifting either by clamping a disc on the drill on either side of the limb in contact with the soft parts, or, preferably, by forcing close-fitting metal tubes or sleeves of suitable length, and of a diameter slightly greater than the diameter of hole in the bone, over the protruding ends of the drill and into contact with the firm outer cortical layer of the bone, and fixing said sleeves to the drill by suitable clamps. Alternatively, the bone may be fixed with respect to the drill by clamping to each projecting end of the drill an element supporting and guiding a spike which is forced through the soft parts and into contact with the bone.

In the illustrated embodiments of my invention, the drills 34, 38, 59, 61, and 117 are of the first-mentioned type, while the drill 152 is of the second-mentioned type.

After the drills of the first-mentioned type have been passed through the limb in the manner above described, each drill is clamped to the arms of a saddle of the type illustrated.

Over each drill of the second-mentioned type (see drill 152 of Fig. 5) there is sleeved a tubular element of the type illustrated at 150 having a lock bolt and nut, a set screw 151, or some other suitable means for clamping it immovably to the drill when adjustment is completed; and that tube is then associated with the split sleeve 54h of a bracket unit 39h mounted upon an element of the type illustrated at 149'.

Alternatively, drills of the type of drill 152 may be supported in the manner illustrated in Figs. 19, 20, and 21. The reference numeral 210 indicates an end of either a saddle or an element like the element 149'; and it is preferably cylindrical at its upper end as at 211, said cylindrical portion being formed with a peripheral groove 212.

A split clamping sleeve 213 is mounted upon said cylindrical portion 211 and is provided with a set screw 214 adapted to be received in the groove 212. A clamping bolt 215 is provided for locking the sleeve in desired position.

At its upper end, the sleeve is provided with separated discs 216 and 217, a clamping bolt 218 being provided to draw the said discs 216 and 217 together. Said bolt, in use, passes through a disc 219 received between the discs 216 and 217, and carrying a split sleeve 220 in which is received the drill 152. A clamping bolt 221 is provided for locking the drill in adjusted position in the sleeve 220.

In order to guard against possible axial movement of the drill 152 in the sleeve 220, I may provide a pair of stop collars 222 which are illustrated in detail in Fig. 21. Each of said collars is formed with a non-radial slot 223 opening into a central bore 224, whereby the collar may be slipped into place on the drill 152, the drill slipping from the slot 223 into the bore 224, and being adapted to be held therein by means of a set screw 225.

Alternatively, the sleeve 213 might be mounted on an end of one of the rods or tubes 57 or 72.

It will be seen that this arrangement provides still greater flexibility of movement for the drill 152.

Assuming that drills of the type which are projected entirely through the limb have been used in the above-described steps of passing two drills through the limb above the fracture and two drills through the limb below the fracture, I shall now describe the manner in which these drills are associated with the frame-work of the structure illustrated herein.

If we assume that we are working with an organization of the general type illustrated in Fig. 1, and if we assume that the drills 34, 59, 61, and 38 have been passed through the limb with the drill 34 nearest to the trunk and the drill 38 farthest from the trunk, the saddles 29 and 29' will now be attached to the drills 34 and 38 either before or after they are mounted in the guideways of units 18 and 18'. Depending upon the requirements of the case, these units may be mounted either upon the rod 15 or upon one of the other types of threaded rods disclosed in the drawings. The unit 18 is now clamped to the rod 15 to prevent any shifting thereof during further adjustment of the bone fragments, and the saddle 29 is rotated, for instance by adjustment of the hand-wheel 32 associated therewith, until the axial position of the proximal segment of the limb is satisfactory; and the saddle is then locked and retained in this adjusted position. Of course, depending on the type of mounting for the saddle used, this rotation of the saddle may be either manual or through the medium of a pinion or a worm. Those locking devices which prevent rotation of the proximal fragment about its own axis being tightened, and the remaining locking devices of the organization being loose, gross axial, longitudinal and lateral displacement of the fragments are either individually and successively, or in combination and synchronously corrected; and as each individual displacement is apparently corrected, the locking devices are tightened as necessary to prevent its recurrence, until finally all displacements have been apparently corrected. The locking devices are thereafter undisturbed except to permit further adjustment of the main fragments when the necessity therefor is indicated by clinical or X-ray examination, puncture exploration or operative exposure of the fractured bone ends.

During this adjustment, when it appears that rotation of the distal segment on its long axis is necessary to correct axial displacement, this may be accomplished, in the organization of Fig. 1, by rotating the saddle 29' about its center of curvature, either manually or mechanically; or, in the organization of Fig. 5, it may be accomplished by rotating the saddle 105 about the axis of the disc 86 of the unit 85, either manually or mechanically. After such gross adjustment, the adjusted saddle is locked in position.

When shifting of the distal supporting element is indicated to correct overriding or longitudinal separation of the fractured ends of the main bone fragments or to separate the bone ends enough longitudinally to permit lateral movement of their more or less jagged surfaces over each other during correction of lateral displacement, this is accomplished by the adjustment of the nuts 36 and 37 in such a manner as to shift the drill 38 of Fig. 1 or 117 of Fig. 5 in the desired direction.

When lateral shifting of the fractured bone ends is indicated to bring the main fragments into alignment and to bring their fractured surfaces into proper relationship with each other, an effort is made to accomplish this first by manual movement of the bone ends for what seems to be the proper distance in the proper direction. These apparently simple movements result from a more or less complex combination of movements as follows:

The bone segments may be rotated about the axes of the drills 34 and 38 to shift their adjacent ends generally up and down; and the bone segments may be rotated about vertical axes to shift their adjacent ends generally in a horizontal plane. In either the organization of Fig. 1 or that of Fig. 5, the former type of movement is accomplished manually. In the organization of Fig. 1, the latter type of movement is effected by adjustment of the saddle 29 and 29' about the centers of the housings 24; which adjustment may be accomplished either manually or mechanically. In the organization of Fig. 5, the latter type of adjustment may be accomplished by shifting the saddle 105 either about the axis of the post 82, or about its own center of curvature, either of which types of adjustment may be effected either manually or mechanically. When these various types of adjustments have been effected to bring the bone ends substantially into proper coaptation, the various means for locking the saddles 29 and 29' (or 105) are tightened.

Even after such locking of the terminal drills, fixation of the main segments is not complete, since there is nothing to prevent gravity and muscle pull from rotating the bone segments about the drills as axes, to displace the adjacent ends laterally at right angles to the drills. To prevent this, and to complete fixation of the fragments while permitting adjustment thereof as indicated, saddles are attached to the intermediate drills, and those saddles are associated, either before or after attachment to the drills, with suitable supporting units mounted upon the rod 15 either directly or through the intermediation of separate carrying nuts.

Referring, again, to Fig. 1, the saddles 58 and 60 are attached to the drills 59 and 61 which have previously been driven through the limb adjacent the point of fracture. Either before or after attachment of saddles 58 and 61 to the said drills, the units 39 and 39a are connected to the saddle 29, and the units 39d and 39e are attached to the saddle 29'. Because of the universal adjustability of the units 39a, 39b, 39c, 39d, 39e, 39f, and 39g, it is possible now, the various clamping bolts being loosened, to connect the units 39b and 39c to the saddle 58 and to connect the units 39f and 39g to the saddle 60, the units attached to the saddles 58 and 60 being connected to the units attached to the saddles 29 and 29' by the rods 57, 57a, 57b and 57c. If, now, all of the clamping bolts of the various 39 units are tightened, it will be readily apparent that the two segments of the fractured bone are held against any possible movement.

Clinical or X-ray examination, puncture exploration or operative exposure of the bone ends will now be resorted to to determine whether or not the fractured ends are in accurate and satisfactory apposition. If it is found that they are not, efforts are made (after loosening the clamping nuts 49 of the units 39, 39a, 39d, and 39e and the clamping element 26 of units 18 and 18') to bring the bone ends into such accurate apposition by manual manipulation to effect vertical correction, by adjustment of the saddles about their centers of curvature to effect axial correction, and by adjustment of the platforms 24 of units 18 and 18', to effect horizontal correction, to bring the segments into proper apposition. If these efforts are successful and the bone fragments are brought into satisfactory alignment and their fractured surfaces into close and satisfactory apposition, all locking devices are tightened and the fragments are retained in this position either until they are firmly united or until reaction of the limb to injury or infection has subsided or the wounds healed sufficiently to permit application of a plaster cast incorporating the drills to hold the bone fragments in the same relative position, after which the limb is removed from the frame and the patient becomes ambulatory unless otherwise contraindicated. Alternatively, in some instances, it is possible to apply brackets 62 and 62a to the saddle 58, to apply brackets 62b and 62c to the saddle 60, to connect those brackets by rods 72 and 72a, and to lock the rods in position. Thereafter, the bone fragments may be retained in proper rigid relation to each other solely through the medium of the four saddles and their connecting units, the saddles 29 and 29' being removed from their supporting units 18 and 18'. Such an arrangement is, of course, highly advantageous, since it gives the patient materially increased freedom and is therefore conducive to added comfort.

If lateral adjustment of fractured bone ends cannot be made manually with sufficient precision and accuracy, the saddles 58 and 60 are mounted, for instance in the manner of saddles 105b and 105a of Fig. 5. By shifting the sleeve of each supporting element 85a or 85b, and by shifting the supporting rods 118 and 119, the fractured bone ends may be mechanically shifted with precision and accuracy any distance in any direction indicated, until physical and X-ray examinations, exploratory punctures, or operative exposure of the bone ends shows satisfactory alignment and apposition of the main bone fragments. After such satisfactory alignment and apposition has been effected, the limb may be retained in an organization of the character of Fig. 5, or the intermediate saddles may be connected to the terminal saddles in the manner illustrated in Fig. 1, the bone fragments being thus held either until repair is completed or until a cast is applied in the manner above described.

Drills of the type of the drill 152 in Fig. 5 may be used in place of drills of the type of the drill 34, but I prefer to use drills of the type of drill 152 only for the purpose of locating and fixing detached bone fragments.

While I have illustrated certain arrangements of the elements of the present invention, it is to be understood that there is a substantially illimitable possibility of variations in those arrangements. For example, any of the rods used in the invention may be either plain or threaded, may be with or without one or more kerfs, may or may not be provided with circular grooves adjacent its ends for cooperation with set screws in supporting sockets to permit rotation of the rod, and may or may not be provided with a terminal element receivable between a pair of clamping discs to be mounted upon the clamping bolt. Any of the saddle support units may or may not be constructed to permit adjustment of the saddle or the supporting platform manually, by a spur-gear, by a crown-gear, or by a worm-gear; the support may or may not provide for removal of the saddle therefrom without disturbing the drill held by the saddle.

The various sleeves of the present invention may be either closed tubes or split tubes, and may or may not be hinged tubes. Similarly, the various sleeves may or may not be provided with a key which may be fixed or shiftable. Depending upon the required uses of the sleeves, they may or may not be provided with set screws for cooperation with annular grooves in associated rods; and such sleeves may or may not be associated with shifting nuts at one or both ends thereof. In the same way, such sleeves may or may not be provided with worm-wheels at one or both ends thereof for cooperation with a unit of the type illustrated in Figs. 16, 17 and 18.

The unit of Figs. 16, 17 and 18 may be provided with a closed tube for association with the supporting rod, with a split tube, or with a hinged tube. It may or may not be provided with a key which may or may not be shiftable; and it may or may not be so constructed that the worm may be readily shifted out of normal position to permit gross adjustment of the element normally operated by the worm.

It is to be understood that the exigencies of the particular case which confronts a surgeon will determine the manner in which the surgeon will combine the various units of the present organization to provide a satisfactory structure to perform the operation which appears to be necessary; and that only the skill of the surgeon who is operating can determine the proper steps to be taken and the proper sequence of those steps. I have provided however, mechanism which, in the hands of the skillful surgeon, will materially facilitate the operations necessary to bring badly fractured bone fragments into proper coaptation, and to hold them there with a minimum of deleterious effect upon the soft parts surrounding the fractured bones.

For instance, if it is found that the elements mounted on the rod 15 of Fig. 5 are too closely crowded, the unit which carries the rod 118 may be differently mounted as follows: Upon the rod 125, in place of the unit 124, may be mounted a similar unit carrying a threaded rod, said rod projecting horizontally toward the end of the frame carrying the mounting 14. Upon that horizontally projecting rod may then be mounted the unit 124, carrying the rod 123 and the rod 119; and that same horizontally projecting rod may likewise carry the corresponding elements whereby the rod 118 is supported.

I claim as my invention:

1. In a device of the class described, a base, a saddle carried by said base and provided with means adjacent the extremities of its two arms for gripping a wire adapted to be projected through a bone, a bracket secured to each of said arms and comprising a gripping element movable about two perpendicular axes, independent means operable to prevent movement of said gripping element about either of said axes, a rod received in each of said gripping elements, a second saddle provided with means adjacent the extremities of its two arms for gripping a second wire adapted to be projected through a bone, a bracket secured to each of the arms of said second saddle and comprising a gripping element movable about two perpendicular axes, and independent means operable to prevent movement of each of said last-mentioned gripping elements about either of its associated axes, said rods being received also in said last-mentioned gripping elements.

2. In a device of the class described, a bone-manipulating unit comprising a saddle adapted to be adjustably mounted on a base, a second saddle, two members adapted to be driven through a bone at spaced points, means on said respective saddles for gripping the opposite projecting ends of said respective members, and means providing a manipulable connection between said saddles, said last-named means comprising two rods extending between the arms of one of said saddles and the corresponding arms of the other of said saddles, and means connecting said rods to said arms and permitting, at times, substantially universal movement of said second saddle with respect to said first saddle but preventing, at other times, any movement of said second saddle other than oscillation thereof substantially about the axis of the bone-penetrating member associated with the first saddle.

3. In a device of the class described, a unit comprising a saddle mounted on a base, two brackets secured to said saddle adjacent the opposite ends thereof, each bracket comprising a trunnion located substantially in the plane of said saddle, a clamping sleeve mounted on said trunnion and carrying a second trunnion substantially perpendicular to said sleeve, a second clamping sleeve mounted on said second trunnion and carrying a third clamping sleeve substantially perpendicular to said second sleeve, means for independently tightening or loosening said respective clamping sleeves, a rod carried in the third clamping sleeve of each bracket, bone-engaging means carried by said saddle, and bone-engaging means associated with and supported and positoned by said rods.

4. In a device of the class described, a unit comprising a saddle mounted on a base, two brackets secured to said saddle adjacent the opposite ends thereof, each bracket comprising a cylindrical element located substantially in the plane of said saddle, a second cylindrical element supported by said first cylindrical element for oscillation about a common axis, a third cylindrical element rigidly associated with said second cylindrical element, a fourth cylindrical element supported by said third cylindrical element for oscillation about a common axis, a fifth cylindrical element rigidly associated with said fourth cylindrical element, a support carried by the fifth cylindrical element of each bracket, and independent means operable to prevent oscillation of said second and fourth cylindrical elements and to prevent movement of said support relative to the fifth cylindrical element of each bracket.

5. In a device of the class described, a base, two standards carried by said base for adjustment toward and away from each other, a first saddle carried by one of said standards, a second saddle carried by the other of said standards, a third saddle, means carried by said first saddle for positioning said third saddle, a fourth saddle, means carried by said second saddle for positioning said fourth saddle, bone-engaging means rigidly connected to each of said saddles, and means connecting said third and fourth saddles and cooperating with said positioning means to lock said first, second, third, and fourth saddles into a rigid unit.

6. In a device of the class described, a base, two standards carried by said base for adjustment toward and away from each other, a first saddle carried by one of said standards, a second saddle carried by the other of said standards, means carried by said standards for adjusting said saddles with respect to said standards and to each other, a third saddle, means carried by said first saddle for positioning said third saddle, a fourth saddle, means caried by said second saddle for positioning said fourth saddle, whereby said first and third saddles constitute a unit adjustable by said adjusting means and said second and fourth saddles constitute a unit adjustable by said adjusting means, bone-engaging means rigidly connected to each of said saddles, and means connecting said third and fourth saddles and cooperating with said positioning means to lock said first, second, third, and fourth saddles into a rigid unit.

7. A unit for use in a device of the class described, comprising a clamp, a trunnion projecting from said clamp, a clamping sleeve mounted on said trunnion and carrying a second trunnion substantially perpendicular to said sleeve, a second clamping sleeve mounted on said second trunnion and carrying a third clamping sleeve substantially perpendicular to said second clamping sleeve, and independent means for tightening said respective clamping sleeves.

8. A unit for use in a device of the class described, comprising a clamp, a pair of spaced legs carried by said clamp and formed with aligned perforations, a substantially spherical element having a polar bore therethrough received between said legs and partially penetrating said perforations, a rod mounted in said bore, means carried by said element for holding said rod against movement in said bore, and means for urging said legs toward each other.

9. A holder for a curved saddle comprising a curved guide having an open side, one curved wall of said guide being formed with a groove, and a removable closure plate, having one edge receivable in said groove, to close the open side of said guide.

10. A holder for a curved saddle comprising a curved guide having an open side through which a saddle may be received, one curved wall of said guide being of a lateral extent substantially equal to the thickness of said saddle and the other being of greater lateral extent and being formed with a groove in its inner surface, and a removable closure plate having one edge receivable in said groove.

11. A holder for a curved saddle comprising a curved guide having an open side through which a saddle may be received, one curved wall of said guide being of a lateral extent substantially equal to the thickness of said saddle and the other being of greater lateral extent and being formed with a groove in its inner surface, one wall of said groove being located substantially in the plane of the lateral edge of said one curved wall, and a removable closure plate having one edge receivable in said groove and having its opposite edge held in contact with said lateral edge.

12. A holder for a curved saddle comprising a curved guide having an open side through which a saddle may be received, one curved wall of said guide being of a lateral extent substantially equal to the thickness of said saddle and the other being of greater lateral extent and being formed with a groove in its inner surface, one wall of said groove being located substantially in the plane of the lateral edge of said one curved wall, a removable closure plate having one edge receivable in said groove, and having its opposite edge held in contact with said lateral edge, and spring means urged by said closure plate into contact with the adjacent surface of said saddle.

13. A holder for a curved saddle comprising a curved guide having an open side through which a saddle may be received, one curved wall of said guide being of a lateral extent substantially equal to the thickness of said saddle and the other being of greater lateral extent and being formed with a groove in its inner surface, one wall of said groove being located substantially in the plane of the lateral edge of said one curved wall, a removable closure plate having one edge receivable in said groove, and having its opposite edge held in contact with said lateral edge, and spring means carried by said closure plate and bearing on the adjacent surface of said saddle.

14. A holder for a curved saddle comprising a curved guide having an open side through which a saddle may be received, one curved wall of said guide being of a lateral extent substantially equal to the thickness of said saddle and the other being of greater lateral extent and being formed with a groove in its inner surface, one wall of said groove being located substantially in the plane of the lateral edge of said one curved wall, means cooperating with said lateral edge to form a slot, a removable closure plate having one edge receivable in said groove, and a tongue on the opposite edge of said plate receivable in said slot.

15. In a device of the class described, a base including a rod of circular cross-section, a plurality of supports mounted on said rod and adjustable axially thereof, a saddle carried by each of said supports, bone-engaging means rigidly connected to each of said saddles, and toothed means associated with at least one of said supports for securing the same in any one of a plurality of adjusted positions about the axis of said rod.

16. In a device of the class described, a base including a rod of circular cross-section, a plurality of supports mounted on said rod and adjustable axially thereof, a saddle carried by each of said supports, bone-engaging means rigidly connected to each of said saddles, and means associated with at least one of said supports for mechanically shifting the same incrementally to any position of adjustment about the axis of said rod and holding the same in any such adjusted position.

17. In a device of the class described, a base including a rod of circular cross-section and provided with a longitudinally extending kerf, a plurality of supports mounted on said rod and adjustable axially thereof, a saddle carried by each of said supports, bone-engaging means rigidly connected to each of said saddles, at least one of said supports comprising a tubular element mounted on said rod and provided at one end with a worm wheel, a unit mounted on said rod and provided with a shiftable key projectible, at will, into said kerf to prevent movement of said unit about the axis of said rod, and a worm carried by said unit upon an axis perpendicular to a plane including the axis of said rod, said unit being associable with said one support to mesh said worm with said worm wheel.

18. In a device of the class described, a base including a rod of circular cross-section and provided with a longitudinally extending kerf, a plurality of supports mounted on said rod and adjustable axially thereof, a saddle carried by each of said supports, bone-engaging means rigidly connected to each of said saddles, at least one of said supports comprising a tubular element mounted on said rod and provided at one end with a worm wheel, a unit mounted on said rod and provided with a shiftable key projectible, at will, into said kerf to prevent movement of said unit about the axis of said rod, an axle carried by said unit upon an axis perpendicular to a plane including the axis of said rod and oscillable, at will, about an axis parallel to the axis of said rod, a worm journalled on said axle, said unit being associable with said one support to mesh said worm with said worm wheel, and means engageable by said axle to prevent oscillation thereof about said last-named axis.

ALBERT A. THOMAS.